United States Patent [19]

Rowlette

[11] 4,162,990

[45] Jul. 31, 1979

[54] METHOD AND COMPOSITION FOR RETARDING WATER EVAPORATION

[75] Inventor: John J. Rowlette, Arcadia, Calif.

[73] Assignee: Duane D. Erway, South Pasadena, Calif. ; a part interest

[21] Appl. No.: 444,827

[22] Filed: Feb. 22, 1974

[51] Int. Cl.$^2$ ................................................ B01J 1/18
[52] U.S. Cl. ..................... 252/383; 252/384; 422/43
[58] Field of Search ........................ 252/383, 384, 381; 21/60.5 R, 60.5 A; 422/43

[56] References Cited

U.S. PATENT DOCUMENTS

| | | | |
|---|---|---|---|
| 2,797,139 | 6/1957 | Veatch | 21/60.5 R |
| 3,391,987 | 7/1968 | Myers | 252/384 |
| 3,450,488 | 6/1969 | Dressler | 252/381 |
| 3,531,239 | 9/1970 | Rowlette | 252/383 |
| 3,549,313 | 12/1970 | Eckert et al. | 252/384 |

OTHER PUBLICATIONS

Carbowax Polyethylene Glycols, Union Carbide, 1972, pp. 1-3.

*Primary Examiner*—Benjamin R. Padgett
*Assistant Examiner*—Irwin Gluck
*Attorney, Agent, or Firm*—Christie, Parker & Hale

[57] ABSTRACT

A method and composition for forming a thin film of evaporation retarding agent upon a water surface by applying to the water, solid macroscopic particles of a saturated, aliphatic, interface-active hydrocarbon in solid solution with a spreading agent, e.g., a polyethylene glycol, that is soluble in both water and the hydrocarbon. Preferably, the particles are admixed with solid macroscopic particles of a filler material capable of generating a gas upon contact with water and compacted into a tablet, pellet or other solid unitary form for application to a water surface.

18 Claims, No Drawings

METHOD AND COMPOSITION FOR RETARDING WATER EVAPORATION

BACKGROUND OF THE INVENTION

This invention relates to water evaporation retardation and, more particularly, to improving the spreadability of evaporation retarding agents.

My U.S. Pat. No. 3,531,239, which issued on Sept. 29, 1970, discloses a method for forming a thin film of an evaporation retarding agent upon a water surface, and a composition which when added to water results in such a film. A solid admixture of the particulate retarding agent, which is a saturated, aliphatic, interface-active hydrocarbon, and a water soluble filler material is applied to the water surface in the form of a compacted unitary solid such as a tablet. The filler material serves to separate the particles of the retarding agent so it spreads more quickly upon contact with the water. Suitable filler materials are usually so dense that the bulk density of the compacted solid is greater than one. To maintain the compacted solid on the surface of the water while the retarding agent spreads, my U.S. Pat. No. 3,531,239 teaches the use of a filler material capable of generating a gas upon contact with water. My patent also teaches that the gas bubbles generated will bring evaporation retarding agents to the surface to form a film even in cases where the tablet itself sinks. A suitable gas generating filler material is sodium bicarbonate and tartaric acid.

In general, the longer the chain length of the hydrocarbon, the more effective is the resulting monomolecular layer as an evaporation retardant, but the slower the layer spreads over the water surface. For example, the smallest chain length that can seriously be regarded as an effective evaporation retardant is $C_{16}$. Even a hydrocarbon with a chain length of $C_{18}$ spreads too slowly to be practical for many purposes when applied alone in the manner described in my above referenced patent, so it normally must be mixed with a $C_{16}$ hydrocarbon to improve the spreadability.

SUMMARY OF THE INVENTION

According to the invention, a saturated, aliphatic, interface-active hydrocarbon in solid solution with a water soluble spreading agent is applied to a water surface in the form of separated particles. A suitable spreading agent is a nonhygroscopic polyethylene glycol solid at room temperature in solution with the hydrocarbon.

Preferably, the particles of the solid solution are admixed with a filler material capable of generating a gas upon contact with water; the admixture is compacted into a tablet, pellet or other solid form, which is applied to the water surface. Preferably, the compacted solid unit is designed so that when it contacts the water surface, the generated gas maintains the unit on the water surface, while the hydrocarbon spreads to form a monomolecular layer. If the unit sinks, the generated gas bubbles will bring evaporation retarding agents to the surface to form a film. The filler material serves to separate the particles of the solid solution from each other, thereby increasing the surface area of the solid solution exposed to the water as the filler material dissolves, and the spreading agent serves to separate individual hydrocarbon molecules from each other. As the spreading agent dissolves in the water, the hydrocarbon molecules are spread at a substantially faster rate than they are in a pure unmixed form. For example, experiments show that an evaporation retarding hydrocarbon having a chain length of $C_{22}$ applied to the water surface in the described manner can be spread more quickly than a $C_{16}$ hydrocarbon applied in the manner described in my referenced patent.

A feature of the invention is to mix an evaporation retarding hydrocarbon having a specific gravity less than one and a spreading agent having a specific gravity greater than one in such proportions that the resulting solid solution has a specific gravity less than one. This insures that the particles of the solid solution remain on the water surface after they are free of the tablet, pellet or other solid unit.

Preferably, the tablets, or pellets or other compacted unitary solids are made in the following manner: an evaporation retarding hydrocarbon and a solid, nonhygroscopic polyethylene glycol spreading agent that is soluble in the hydrocarbon are combined; the hydrocarbon and the spreading agent are individually heated before combining or jointly heated after combining to a temperature above both their melting points; the melted hydrocarbon and spreading agent are mixed to form a liquid solution; the solution is cooled to a solid state; the solution in solid state is ground into particles; the particles are admixed with a filler material capable of generating a gas upon contact with water; and the admixture is compacted into a solid unit having a suitable bulk density and hardness.

DESCRIPTION OF THE PREFERRED EMBODIMENT

The disclosure of my U.S. Pat. No. 3,531,239, which issued Sept. 29, 1970, is incorporated herein by reference. In the preferred embodiment of the present invention, a spreading agent improves the spreadability of long chain, saturated, aliphatic, interface-active hydrocarbons admixed with a filler material in a solid compacted evaporation retardant tablet, pellet, briquette, or other unit. My referenced patent identifies a large number of suitable evaporation retarding hydrocarbons, and states the properties required therefor. Other suitable hydrocarbons are docosanol and docosanoic acid.

The spreading agent is a material that is readily soluble in both water and the evaporation retarding hydrocarbon. In order to apply the evaporation retarding agent to the water in the preferred embodiment of a solid compacted admixture, the spreading agent must be a solid at room or ambient temperature, at least when in solution with the evaporation retarding hydrocarbon.

One very important use of the invention is in evaporation retardant tablets dispensed automatically onto the surface of a swimming pool at regular intervals over a long period of time by the system disclosed in my copending application, Ser. No. 444,826, filed Feb. 22, 1974 and entitled CHEMICAL DISPENSING SYSTEM. Unless elaborate and costly measures are taken to keep water vapor out of the dispensing system, the spreading agent must be nonhygroscopic; otherwise, while the tablets are stored in the dispensing system, moisture would dissolve the filler material, release the gas, and prevent satisfactory spreading.

The polyethylene glycol family, a number of members of which are sold commercially by Union Carbide Corporation under the trademark CARBOWAX, is water soluble. The members of the CARBOWAX family are designated by numbers that correspond approximately to their respective molecular weights, i.e., CARBOWAX 600, 1500, 4000, and 6000. This family has a general chemical formula HOCH$_2$(CH$_2$OCH$_2$)$_x$CH$_2$OH. CARBOWAX 600 and CARBOWAX 1500 are not generally suitable as a spreading agent for a solid, compacted evaporation retardant because they are liquid at room temperature. CARBOWAX 6000 is not generally suitable as a spreading agent because it is not sufficiently soluble in evaporation retarding hydrocarbons. CARBOWAX 4000, which has a molecular weight between 3000 and 3700, is a generally suitable spreading agent for all uses including the above described swimming pool dispensing system, because it is soluble in both water and the evaporation retarding hydrocarbons, is nonhygroscopic, and is solid at room temperature.

Although diacetin and triacetin are soluble in both water and the evaporation retarding hydrocarbons, they are not generally suitable spreading agents in the above described swimming pool dispensing system because they are liquid at room temperature and very hygroscopic.

Another important use of the invention is to dispense solid compacted evaporation retardant units onto large natural bodies of water such as lakes and ponds. In such case, diacetin would be a suitable spreading agent if the evaporation retardant units are stored in air tight drums cooled to a temperature below the melting point of the solution of diacetin and the evaporation retarding hydrocarbon. The invention can also be used to dispense on a body of water a solution of spreading agent and evaporation retarding hydrocarbon in liquid form. In such case, triacetin would be a suitable spreading agent.

In the preferred embodiment, the water retarding agent and the spreading agent are melted and mixed to form a liquid solution. The solution is cooled to room temperature, where it is a solid. After the solution solidifies, it is ground to form macroscopic particles. If the particles are too large, the evaporation retarding hydrocarbon will spread too slowly. If the particles are too small, too much of the evaporation retarding hydrocarbon will have to be used to obtain an effective monomolecular layer because the particles will be influenced by convection currents in the water and few will reach the water surface. (These convection currents are apparently caused by concentration gradients from the desolution of salts in the tablets used to apply the retarding agent.) Thus, the upper and lower limits on particle size are governed respectively by the desired spreading speed and the desired economy of evaporation retarding agent. In practice, particles with an average size of one millimeter or less are preferred. It is also preferred to have a wide range of individual particle sizes from the point of view of spreading speed and economy so long as there are not too many particles small enough to be influenced substantially by convection currents. The evaporation retarding hydrocarbons generally have a specific gravity less than one, and CARBOWAX 4000 has a specific gravity greater than one. The evaporation retarding hydrocarbon and spreading agent are preferably mixed in a proportion that results in a solid solution with a specific gravity less than one, so the evaporation retarding hydrocarbon agent is sure to remain on the water surface while the spreading agent is dissolving. Even in cases where the specific gravity is more than one, surface tension will float some of the retarding agent.

In the preferred embodiment, the ground particles of the evaporation retarding hydrocarbon and spreading agent in solid solution are admixed with a water soluble filler material capable of generating a gas upon contact with water. The admixture is compacted into tablets, or pellets, or other solid unitary form for later application to a water surface. The types of filler materials and their proportions are selected to provide the smallest possible bulk density in the compacted admixture. The admixture is compacted to obtain the degree of hardness described in my referenced patent, and a bulk density that does not exceed 1.4. The various filler materials described in my referenced patent may be used.

In a specific example, there was used for a water evaporation retardant in compacted solid unitary form the following formulation by weight percent:

| | |
|---|---|
| Octadecanol | 35.0% |
| CARBOWAX 4000 | 3.5% |
| Sodium carboxymethyl cellulose (CMC) | 16.6% |
| Magnesium stearate | 4.1% |
| Tartaric acid | 18.9% |
| Sodium bicarbonate | 21.9% |

The CMC serves as a water soluble filler material that reduces the bulk density of the resulting solid unit; in Example I of my referenced patent, sucrose performs this function. The magnesium stearate, tartaric acid, and sodium bicarbonate serve the same functions described in my referenced patent.

The octadecanol, which is a solid at room temperature, and the CARBOWAX 4000, which is a solid at room temperature, were placed in a vessel and heated together to a temperature of about 70° C., where they are both in a liquid state. While in a liquid state, the octadecanol and CARBOWAX 4000 were mixed to form a liquid solution. The liquid solution was poured into a shallow pan and permitted to cool to room temperature, thereby forming a solid solution. The solid solution of the octadecanol and CARBOWAX 4000 was ground in a Waring blender, the resulting particles were passed through screening of 10 mesh. The particles of the solid solution were then admixed with the remaining ingredients. The resulting admixture was compacted with a standard tablet forming machine to form tablets having a bulk density of about 1.15. When the tablets were placed upon a water surface, they floated until dissolved. As the tablets disintegrated, the particles of the octadecanol-CARBOWAX solution which broke off from the tablets also floated until the CARBOWAX had dissolved, leaving a thin film of octadecanol spread over the water surface. One of the tablets completely dissolves within a period of about 15 minutes.

The tablets may be stored for long periods of time in the atmosphere without caking, disintegrating, or otherwise becoming unmanageable. They are suitable for use in the swimming pool dispensing system disclosed in my copending application filed on even date herewith.

To summarize, the general characteristics required for the spreading agent are solubility in both water and the evaporation retarding hydrocarbon. In the preferred embodiment where the water retarding agent is applied to a water surface in the form of a slide compacted unit, the spreading agent must also be a solid at room or ambient temperature when in solution with the evaporation retarding hydrocarbon. If the solid compacted unit has a gas generating filler and is stored in a moisture containing environment, the spreading agent must also be nonhygroscopic.

The described embodiment of the invention is only considered to be preferred and illustrative of the inventive concept; the scope of the invention is not to be restricted to such embodiment; other ways of practicing the invention may be devised by one skilled in the art without departing from the spirit and scope of this invention. As an example, a water evaporation retardant could be made by powdering a mixture of macroscopic particles of a saturated aliphatic interface-active hydrocarbon in solid solution with a spreading agent that is soluble in both water and the hydrocarbon. The power could be applied to a water surface in a variety of ways, forming a film to reduce water evaporation. As another example, of liquid solution of the hydrocarbon and spreading agent could be applied to a water surface to obtain the same result.

What is claimed is:

1. A water evaporation retardant consisting essentially of a mixture of a saturated aliphatic interface-active hydrocarbon in solution with a spreading agent that is soluble in both water and the hydrocarbon, the mixture having a sufficiently small specific gravity to float on water.

2. The water evaporation retardant of claim 1, in which the spreading agent is a solid at room temperature when in solution with the hydrocarbon.

3. The water evaporation retardant of claim 2, in which the solid solution forms particles admixed with a solid particulate water soluble filler material capable of generating a gas upon contact with water, the particles of the solid solution having an average size of one millimeter or less, the admixture being compacted to form a tablet, pellet or other solid form.

4. The water evaporation retardant of claim 2, in which the hydrocarbon and the spreading agent are mixed in a proportion such that the solid solution has a specific gravity of less than one.

5. The water evaporation retardant of claim 1, in which the spreading agent is nonhygroscopic.

6. The water evaporation retardant of claim 1, in which the spreading agent is a polyethylene glycol.

7. The water evaporation retardant of claim 6, in which the polyethylene glycol is nonhygroscopic.

8. The water evaporation retardant of claim 6, in which the polyethylene glycol is a solid at room temperature when in solution with the hydrocarbon.

9. The water evaporation retardant of claim 6, in which the polyethylene glycol has a molecular weight between 3000 and 3700.

10. A water evaporation retardant consisting essentially of a compacted solid admixture of macroscopic particles of a saturated aliphatic interface-active hydrocarbon is solid solution with a water soluble spreading agent and particles of a water soluble filler material capable of generating a gas upon contact with water, the particles of the hydrocarbon in solid solution with the spreading agent having a sufficiently small specific gravity to float on water upon generation of the gas.

11. The water evaporation retardant of claim 10, in which the spreading agent is nonhygroscopic.

12. The water evaporation retardant of claim 10, in which the spreading agent is a polyethylene glycol.

13. The water evaporation retardant of claim 12, in which the polyethylene glycol has a molecular weight between 3000 and 3700.

14. The water evaporation retardant of claim 13, in which the hydrocarbon and the spreading agent are mixed in a proportion such that the solid solution has a specific gravity of less than one.

15. The water evaporation retardant of claim 14, in which the hydrocarbon is octadecanol.

16. A method of manufacturing an evaporation retarding composition, comprising the steps of:
   (a) combining a saturated aliphatic interface-active hydrocarbon and a nonhygroscopic spreading agent soluble both in the hydrocarbon and water, the hydrocarbon and the spreading agent being solids at room temperature when in solution;
   (b) heating the hydrocarbon and spreading agent before or after the combining step to a temperature above the melting points of the hydrocarbon and the spreading agent;
   (c) mixing the combination of the hydrocarbon and the spreading agent while such combination is at a temperature higher than said melting points to form a liquid solution of the hydrocarbon and the spreading agent;
   (d) cooling the solution to a solid state;
   (e) grinding the solution in solid state to particles having a sufficiently small specific gravity to float on water;
   (f) mixing the particles with a water soluble filler material capable of generating a gas upon contact with water to form a final composition; and
   (g) compacting the final composition into a solid form.

17. The method of claim 16, in which the compacting step compacts the final composition to a bulk density of not greater than 1.4.

18. The method of claim 16, in which the hydrocarbon and spreading agent are combined in proportions such that the resulting solution in solid state has a specific gravity of less than one.

* * * * *

UNITED STATES PATENT AND TRADEMARK OFFICE
CERTIFICATE OF CORRECTION

PATENT NO. : 4,162,990
DATED : July 31, 1979
INVENTOR(S) : John J. Rowlette

It is certified that error appears in the above-identified patent and that said Letters Patent are hereby corrected as shown below:

Column 4, line 65, "slide" should read -- solid --.
Column 5, line 17, "of" should read -- a --. Column 6, line 2, "is" should read -- in --.

Signed and Sealed this

First Day of April 1980

[SEAL]

Attest:

SIDNEY A. DIAMOND

Attesting Officer      Commissioner of Patents and Trademarks